US008687781B2

(12) United States Patent  (10) Patent No.: US 8,687,781 B2
Lin  (45) Date of Patent: Apr. 1, 2014

(54) PHONE APPLIANCE WITH DISPLAY SCREEN AND METHODS OF USING THE SAME

(76) Inventor: Ching-Yi Lin, New York, NY (US)

( * ) Notice: Subject to any disclaimer, the term of this patent is extended or adjusted under 35 U.S.C. 154(b) by 1096 days.

(21) Appl. No.: 12/106,617

(22) Filed: Apr. 21, 2008

(65) Prior Publication Data

US 2008/0198842 A1 Aug. 21, 2008

Related U.S. Application Data

(63) Continuation of application No. 10/909,680, filed on Aug. 2, 2004, now Pat. No. 7,376,222, which is a continuation of application No. 09/896,593, filed on Jun. 29, 2001, now abandoned.

(60) Provisional application No. 60/214,913, filed on Jun. 29, 2000.

(51) Int. Cl.
*H04M 11/00* (2006.01)
*H04M 1/00* (2006.01)

(52) U.S. Cl.
CPC ..................................... *H04M 1/00* (2013.01)
USPC .................. 379/93.17; 379/93.01; 379/93.23; 370/352

(58) Field of Classification Search
USPC .......... 379/93.01, 93.02, 93.05, 93.08, 93.15, 379/93.17, 93.23, 93.24, 93.25, 110.01, 379/114.01; 370/352–356, 366, 493–495
See application file for complete search history.

(56) References Cited

U.S. PATENT DOCUMENTS 5,127,050 A 6/1992 Takahashi et al.
5,497,339 A 3/1996 Bernard
(Continued)

FOREIGN PATENT DOCUMENTS

JP 408263409 A 10/1966
WO WO 9632800 A1 10/1996

OTHER PUBLICATIONS

PCT International Search Report dated Oct. 18, 2001 for PCT/US01/20896.
*Primary Examiner* — Melur Ramakrishnaiah
(74) *Attorney, Agent, or Firm* — Carter, DeLuca, Farrell & Schmidt, LLP

(57) ABSTRACT

A phone appliance and method of use are provided where the phone appliance can be used to make VoIP communications calls. In a preferred embodiment, the phone appliance includes an RF connection for connecting to a computer or other computing device for facilitating the placement of the VoIP communications calls. The phone appliance further includes a display or portal for depicting advertisements provided by various advertisers. The advertisements provided can be used to defray all or part of the cost associated with making VoIP communications calls. The portal can also be used to communicate with businesses for ordering products, such as ordering a pizza, and to perform various services, such as purchasing stocks. In an exemplary system, the phone appliance is used to transmit to a control center information related to the user of the phone appliance, such as interests and buying habits, and queries for receiving additional information for various advertised products and services. The control center transmits the queries to the appropriate vendors for providing the user with additional information. Other functions and features are provided to the phone appliance, such as being able to download e-mail messages stored within or received by the computer.

367 Claims, 4 Drawing Sheets

(56) References Cited

U.S. PATENT DOCUMENTS

| | | |
|---|---|---|
| 5,515,098 A | 5/1996 | Carles |
| 5,515,305 A | 5/1996 | Register et al. |
| 5,606,361 A | 2/1997 | Davidsohn et al. |
| 5,724,092 A | 3/1998 | Davidsohn et al. |
| 5,761,280 A | 6/1998 | Noonen et al. |
| 5,796,394 A | 8/1998 | Wicks et al. |
| 5,838,775 A | 11/1998 | Montalbano |
| 5,841,424 A | 11/1998 | Kikinis |
| 5,847,698 A | 12/1998 | Reavey et al. |
| 5,848,137 A | 12/1998 | Hsiao |
| 5,884,032 A | 3/1999 | Bateman et al. |
| 5,887,054 A | 3/1999 | Burke et al. |
| 5,892,764 A | 4/1999 | Riemann et al. |
| D411,534 S | 6/1999 | Lepack et al. |
| 5,923,736 A | 7/1999 | Shchar |
| 5,923,738 A | 7/1999 | Cardillo et al. |
| 5,930,341 A | 7/1999 | Cardillo, IV et al. |
| 5,937,041 A | 8/1999 | Cardillo, IV et al. |
| 5,941,648 A | 8/1999 | Robinson et al. |
| 5,953,322 A | 9/1999 | Kimball |
| 5,956,048 A | 9/1999 | Gaston |
| 5,966,667 A * | 10/1999 | Halloran et al. ............ 455/552.1 |
| 5,974,043 A | 10/1999 | Solomon |
| 5,978,833 A * | 11/1999 | Pashley et al. ................ 709/200 |
| 5,983,073 A | 11/1999 | Ditzik |
| 5,986,690 A | 11/1999 | Hendricks |
| 5,991,634 A | 11/1999 | Hui et al. |
| 5,996,006 A | 11/1999 | Speicher |
| 6,002,394 A | 12/1999 | Schein et al. |
| 6,006,088 A | 12/1999 | Couse |
| 6,011,794 A | 1/2000 | Mordowitz et al. |
| 6,018,571 A | 1/2000 | Langlois et al. |
| 6,028,917 A | 2/2000 | Creamer et al. |
| 6,031,836 A | 2/2000 | Haserodt |
| 6,035,180 A * | 3/2000 | Kubes et al. ............... 455/575.1 |
| 6,038,296 A | 3/2000 | Brunson et al. |
| 6,040,829 A | 3/2000 | Croy et al. |
| 6,052,439 A | 4/2000 | Gerszberg et al. |
| 6,058,106 A | 5/2000 | Cudak et al. |
| 6,058,422 A | 5/2000 | Ayanoglu et al. |
| 6,064,967 A | 5/2000 | Speicher |
| 6,065,120 A | 5/2000 | Laursen et al. |
| 6,069,890 A | 5/2000 | White et al. |
| 6,075,783 A | 6/2000 | Voit |
| 6,075,796 A | 6/2000 | Katseff et al. |
| 6,078,566 A | 6/2000 | Kikinis |
| 6,084,953 A | 7/2000 | Bardenheuer et al. |
| 6,108,329 A | 8/2000 | Oyama et al. |
| 6,161,134 A * | 12/2000 | Wang et al. .................... 709/220 |
| 6,169,734 B1 * | 1/2001 | Wilson ........................ 370/352 |
| 6,198,941 B1 * | 3/2001 | Aho et al. ................. 455/552.1 |
| 6,222,520 B1 | 4/2001 | Gerszberg et al. |
| 6,246,489 B1 * | 6/2001 | Park ............................ 358/1.15 |
| 6,335,678 B1 | 1/2002 | Heutschi |
| 6,370,141 B1 | 4/2002 | Giordano et al. |
| 6,377,573 B1 | 4/2002 | Shaffer et al. |
| 6,404,811 B1 * | 6/2002 | Cvetko et al. ............ 375/240.01 |
| 6,411,393 B1 * | 6/2002 | Wakasugi ..................... 358/1.15 |
| 6,424,647 B1 * | 7/2002 | Ng et al. ....................... 370/352 |
| 6,434,403 B1 * | 8/2002 | Ausems et al. ............ 455/556.2 |
| 6,438,384 B1 * | 8/2002 | Chen ............................. 455/462 |
| 6,446,127 B1 | 9/2002 | Schuster et al. |
| 6,449,269 B1 * | 9/2002 | Edholm ........................ 370/352 |
| 6,477,708 B1 * | 11/2002 | Sawa ............................ 725/116 |
| 6,493,437 B1 * | 12/2002 | Olshansky ............... 379/114.13 |
| 6,552,825 B1 | 4/2003 | Doi et al. |
| 6,557,756 B1 * | 5/2003 | Smith ............................ 235/379 |
| 6,560,468 B1 * | 5/2003 | Boesen ...................... 455/569.1 |
| 6,643,283 B2 | 11/2003 | Derks |
| 6,728,546 B1 * | 4/2004 | Peterson et al. .............. 455/462 |
| 6,744,759 B1 | 6/2004 | Sidhu et al. |
| 6,760,324 B1 * | 7/2004 | Scott et al. .................... 370/352 |
| 6,766,524 B1 * | 7/2004 | Matheny et al. ................. 725/23 |
| 6,807,564 B1 * | 10/2004 | Zellner et al. ................. 709/206 |
| 6,826,174 B1 * | 11/2004 | Erekson et al. ............... 370/352 |
| 6,847,403 B1 * | 1/2005 | Forsberg et al. .............. 348/373 |
| 6,854,009 B1 * | 2/2005 | Hughes ........................ 709/220 |
| 6,857,072 B1 * | 2/2005 | Schuster et al. .............. 713/160 |
| 6,888,929 B1 * | 5/2005 | Saylor et al. ............... 379/88.16 |
| 6,889,321 B1 * | 5/2005 | Kung et al. ................... 713/153 |
| 6,937,699 B1 * | 8/2005 | Schuster et al. ............. 379/67.1 |
| 6,944,151 B1 * | 9/2005 | Menard ........................ 370/353 |
| 6,970,474 B1 * | 11/2005 | Sinha ............................ 370/401 |
| 7,076,434 B1 | 7/2006 | Newnam et al. |
| 7,225,409 B1 * | 5/2007 | Schnarel et al. .............. 715/747 |
| 7,451,195 B1 * | 11/2008 | Seligmann ................... 709/220 |
| RE41,211 E * | 4/2010 | Tegler et al. .................... 725/63 |
| 7,945,284 B1 * | 5/2011 | Cao et al. ................... 455/556.1 |
| 2001/0012769 A1 * | 8/2001 | Sirola et al. ..................... 455/90 |
| 2001/0040621 A1 | 11/2001 | Gerszberg et al. |
| 2001/0040948 A1 * | 11/2001 | McClure et al. .......... 379/142.15 |
| 2002/0049073 A1 * | 4/2002 | Bell ............................. 455/552 |
| 2002/0065728 A1 * | 5/2002 | Ogasawara ..................... 705/23 |
| 2002/0126679 A1 * | 9/2002 | Morton ........................ 370/401 |
| 2002/0164003 A1 * | 11/2002 | Chang et al. ............... 379/93.05 |

* cited by examiner

PHONE APPLIANCE WITH DISPLAY SCREEN AND METHODS OF USING THE SAME

PRIORITY

The present application is a continuation application which claims priority to a U.S. Utility Patent Application filed on Aug. 2, 2004 now U.S. Pat. No. 7,376,222 and having U.S. patent application Ser. No. 10/909,680 which is a continuation application of a U.S. Utility Patent Application filed on Jun. 29, 2001 now abandoned and having U.S. patent application Ser. No. 09/896,593 and which claims priority to a U.S. Provisional Application filed on Jun. 29, 2000 and having U.S. Provisional Application Ser. No. 60/214,913, the contents of all applications are incorporated herein by reference.

BACKGROUND OF THE INVENTION

1. Technical Field

The present disclosure relates generally to a communications device and, more particularly, to a phone appliance, which transmit voice over data network, which will henceforth in this patent, vernacularly, be referred to as an IP Phone or phone appliance including a display screen for displaying advertisements and other information downloaded from a network. The present disclosure also relates to a method of using a phone appliance having a display screen and more particularly, to a method of using a phone appliance having a display screen for providing unique benefits to a user, e.g., defraying part or all of the cost of phone service.

2. Background of Related Art

Sending voice over data network, such as Voice-over-Internet protocol (VoIP) communications, is quickly emerging as a viable means for communicating. For example, communications over data networks can entail a calling party using a standard telephone to place a call by connecting to the public switched telephone network (PSTN). The call is routed by the PSTN via the Internet by an originating gateway. After being routed through the Internet, the call exits the Internet and is received by a destination gateway. At the destination gateway, the call is routed through the PSTN to a standard telephone of a called party.

The main advantage of communications over data network is the ability to make long distance telephone calls at a fraction of the cost of traditional circuit-based calls. For example, the calling party may reside in Brooklyn, N.Y. and the called party may reside in London, England. Nonetheless, the calling party is billed for the VoIP telephone call to London, England at a lower rate than tradition circuit-based calls, since much of the voice is transmitted through data network such as the Internet. It is, however, predicted that this main advantage of VoIP communications will soon be reduced. Regulations and laws are being proposed to charge VoIP providers access charges, which comprise a percentage of the cost of providing traditional long distance. Therefore, it is foreseen that once these regulations and laws are passed, consumers will use VoIP communications less frequently than once imagined.

Further, communications over data networks, such as VoIP, may be used for foregoing long distance telephone charges. For example, VoIP communications have not evolved significantly to provide for performing other services while making a VoIP telephone call, such as integrating voice with data, allowing consumers to view advertisements, video clips, etc. and for replying to the same, and making VoIP more seamless for consumers to use.

Additionally, in order to make communications over data network a more lucrative tool for VoIP or a related communications companies, business methods need to be implemented where the communications companies receive a fee for various actions performed by the calling and called parties while on a data communications call.

Therefore, a need exists for preventing a decrease in VoIP or its liked data communications due to charging consumers who make such communication calls at long distance telephone calling rates.

A need also exists for making the use of a PC or other computing device together with a phone seamless when both devices are used to make VoIP communications calls.

A need also exists for enabling consumers to perform other services while making the VoIP communication call and for charging a VoIP communications company or other service provider company, or the consumers, with a fee for the services performed by the consumers. Such fees are likely to be used to defray the cost associated with making VoIP communications calls or other data communications calls at long distance telephone calling rates.

Further, a need exists for a phone appliance having a portal for displaying data transmitted over the VoIP data network.

SUMMARY

In accordance with the present invention, a phone appliance and method of use are provided where the phone appliance can be used to make data communications calls such as VoIP. In a preferred embodiment, the phone appliance includes an RF connection for connecting to a computer or other computing device for facilitating the placement of the VoIP or another data communications type calls. The phone appliance further includes a display or portal for depicting advertisements or information provided by various advertisers or vendors. The advertisements provided can be used to defray all or part of the cost associated with making VoIP or a relate data communications calls. The portal can also be used to communicate with businesses for ordering products, such as ordering a pizza, and to perform various services, such as purchasing stocks. In an exemplary system, the phone appliance is used to transmit to a control center information related to the user of the phone appliance, such as interests and buying habits, and queries for receiving additional information for various advertised products and services. The control center transmits the queries to the appropriate vendors for providing the user with additional information. Other functions and features are provided to the phone appliance, such as being able to download e-mail messages stored within or received by the computer.

BRIEF DESCRIPTION OF THE DRAWINGS

Various preferred embodiments of the presently disclosed phone appliance are described herein with reference to the drawings, wherein.

DETAILED DESCRIPTION OF PREFERRED EMBODIMENTS

Figure 1:
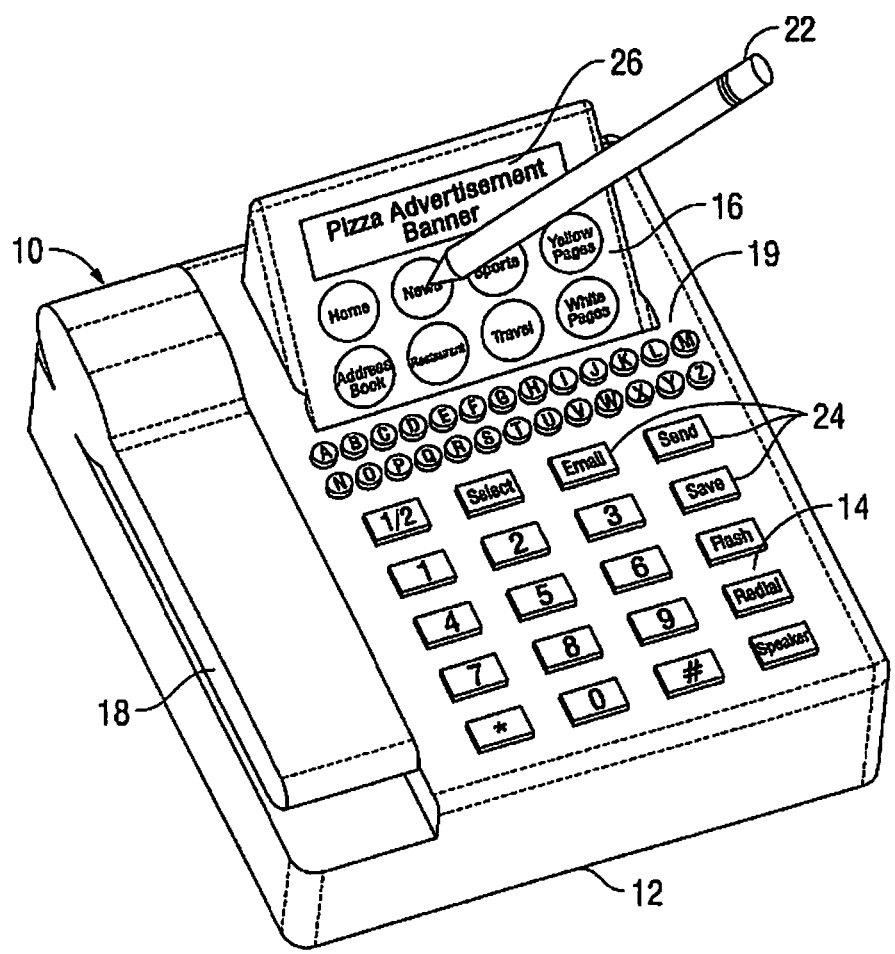
FIG. 1 is a perspective view of the presently disclosed phone appliance.

Preferred embodiments of the presently disclosed phone appliance and methods of use will now be described herein with reference to the attached drawings, in which like reference numerals designate identical or corresponding elements in each of the several views.

Figure 2:
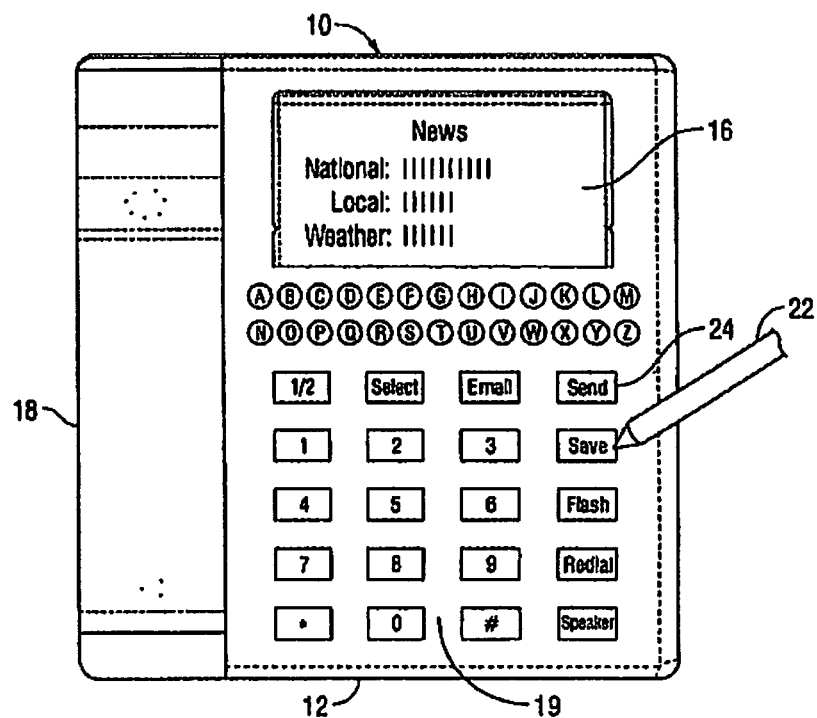
FIG. 2 is a top view of the phone appliance shown in FIG. 1.
Figure 3:
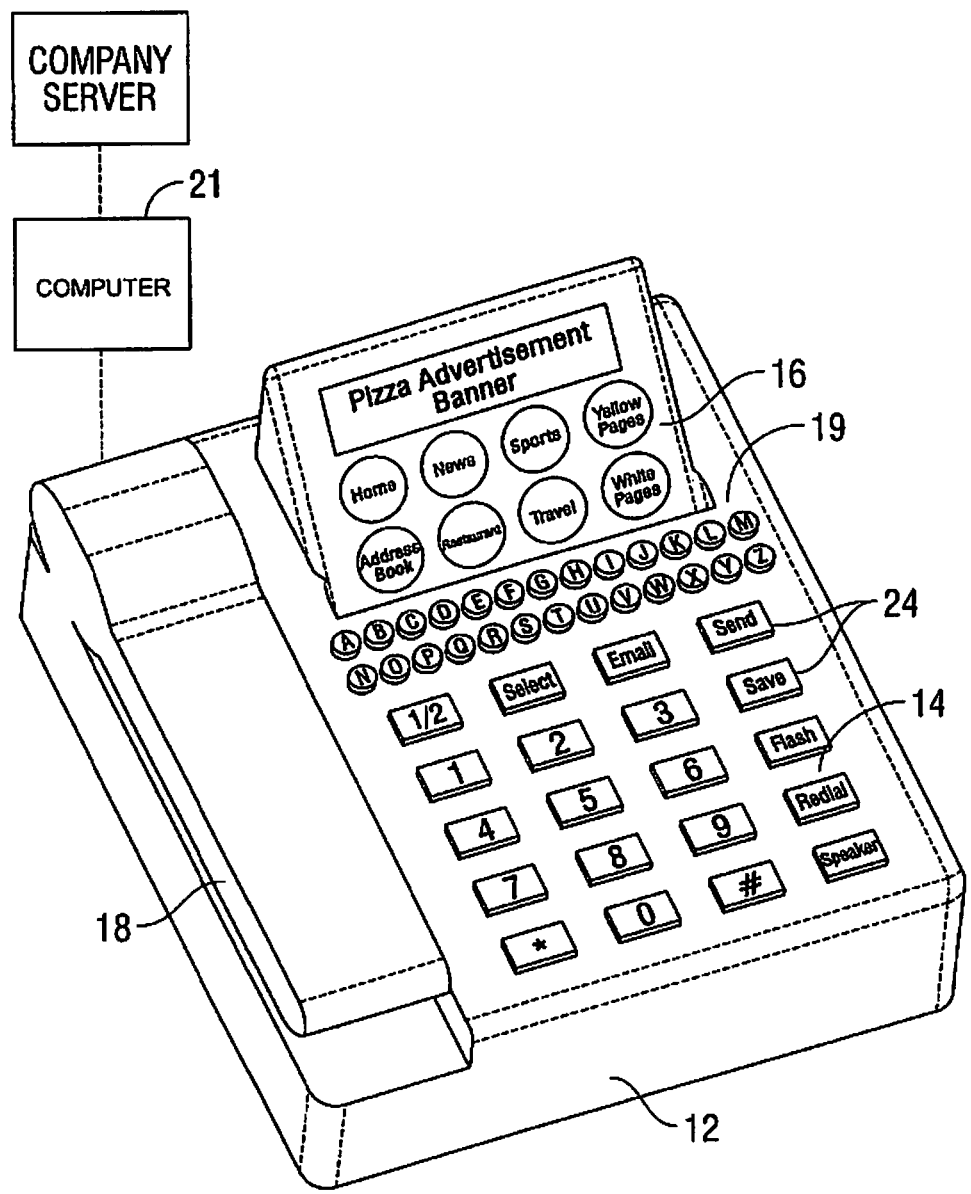
FIG. 3 is a perspective view of the phone appliance shown in FIG. 1 shown schematically interfaced with a personal computer and a company server.

Referring to FIGS. 1-3 below, phone appliance 10 includes a housing 12 having a keyboard 14 and a display screen 16. Display screen 16 is preferably formed from liquid crystal display (LCD). Alternately, other types of display screens may be used, e.g., organic light emitting diodes (OLED). A phone handset 18 is supported on housing 12 in a conventional manner. Handset 18 may be directly connected to the housing 12 via an electrical cord, or alternatively, may be of the cordless type. Although not shown, phone appliance 10 may also include a speaker phone function.

The phone appliance 10 can be adapted to be connected to any computer port to interface phone appliance 10 to a computer 21, but is preferably connected through a universal serial bus (USB) port (not shown). Alternatively, phone appliance 10 can include a wireless transceiver, such as a wireless RF transceiver, to wirelessly interface phone appliance 10 to a computer 21 with a matching transceiver.

Voice data, multimedia data, and other data can be transmitted to and from the computer 21 and phone appliance 10 via the USB port or via RF signals. By using a USB port or RF signals to communicate between the phone appliance 10 and the computer 21, VoIP communications or other type of communications can be integrated with the Internet or a data network in a more cost-effective manner than if the computer 21 alone or the phone appliance 10 alone was used for making VoIP communications over a VoIP data network or another voice over data network.

By using a USB port or RF signals to communicate between the phone appliance 10 and the computer 21, the phone appliance 10 can be provided with less computing, processing and/or memory resources, since the computing, processing and/or memory resources of the computer 21 are used, i.e., shared, by the phone appliance 10 through the USB or RF connection for providing VoIP communications or other data-type communications. By using less computing, processing and/or memory resources, the fabrication and retail costs of the phone appliance 10 may be reduced.

For example, the phone appliance 10 may utilize a network browser program, such as Netscape Navigator™, installed within the computer 21 and the computer's modem for accessing the Internet, thereby, being a cheaper priced phone appliance than a phone appliance that does not communicate via a USB port or RF signals with a computer and must have its own browser program and modem for connecting to the voice over data network. It is a cost-effective to have the phone appliance mimic the computer with services such as e-mail, Internet access and portal features. In such an embodiment, one can use the phone appliance 10 to make VoIP or another data-type communications, or access the Internet, by dialing the called party via the Internet (or other data network) without being "aware" that the call is being placed through the Internet. To the user, the phone appliance 10 is a traditional phone that can be carried anywhere for placing VoIP or other data-type communication calls given the appropriate connections.

It is further provided that the phone appliance 10 includes means for receiving data from the computer 21, such as e-mail, to enable one to access data stored within the computer 21 via the phone appliance 10. Further, the phone appliance 10 can be upgraded with new software by downloading the new software from the data network by the IP phone 10 and/or wirelessly transmit the new software to the IP phone 10 via the RF connection between the computer 21 and the IP phone 10.

Any RF transceiver commercially available from a number of sources, such as Intel (AnyPoint™ Wireless Home Network), can be provided to the phone appliance 10. The computer 21 in turn can access a phone network, such as the PSTN.

The PSTN in turn accesses a data network, such as the Internet. Such access may be obtained a number of ways, for example, via a local area network, a dial up connection, any local loop access technology that calls for modems such as a digital subscriber line (DSL) or a cable modem connection. The data network is used via the computer 21 to transport voice data point-to-point, or partially in conjunction with the PSTN and pathways, to complete the call and carry on a VoIP communication. The data network also transports data to and from the IP phone keyboard 14 and display 16 via the computer 21 for purposes described herein below.

Keyboard 14 includes an alpha-numeric keypad 19 which can be used to place a phone call or access and/or retrieve information from a computer 21 and display the information on display screen 16. For example, display screen 16 is optionally a touch screen which allows the user to access display information such as the yellow pages, addresses, news, stock quotes, etc. by touching a pointer 22 to the corresponding area on display screen 16. A touch pad or mouse ball may also be incorporated in lieu of a touch screen in a known manner to control a pointer on the display screen 16 to select the desired display information.

The phone appliance 10 may also include additional features to improve upon the quality and speed of phone service and/or the security of the transmission system. For example, phone appliance 10 may include a digital signal processor to improve the sound quality of the voice transmission or hardware vocoders and communication circuitry to transmit alpha-numeric as well as voice data. The phone appliance 10 may also include means for converting analog to digital, generating sets or packets of digital data from voice signals and alpha-numeric inputs and means for compressing the digital data to increase the speed and efficiency of the data transmission, including providing better sound quality than a PC sound card. An encryption encoder and a decryption decoder or equivalent software may also be provided in phone appliance 10 to facilitate secure transmission of voice and alpha-numeric information. The phone appliance 10 may further include a video camera or a port for connecting a video camera to the phone appliance 10. The video camera can be used for transmitting a video image of a user of the phone appliance 10, e.g., as in a video-phone. The phone appliance 10 may further include GSM capability.

The phone appliance 10 also includes software and hardware for performing gateway functions that provide two-way, real time communication interfaces between an IP-based or data network and a telephony network including mapping, translation, signaling and control of the media and signaling gateway. By being able to perform gateway functions, the phone appliance 10 prevents the bottleneck effect, since the phone appliance 10 includes in essence the originating gateway. Further, the gateway functions also helps reduce the cost of providing voice-over-data communications networks, since some call origination cost(s) may be eliminated.

In a preferred embodiment, display screen 16 is used to display advertisements or information downloaded from the data network via the computer 21 (FIG. 3). The advertisements or information can be used, for example, to defray the consumer cost associated with phone service. More specifically, advertisements and other information can be downloaded from the data network via the computer 21 onto display screen 16 of IP phone 10 while a VoIP or related data type communication call is in progress. It is also contemplated to download advertisements and other information using the IP phone 10 when there is no VoIP or voice communication call in progress.

In exchange for displaying the advertisements, the advertiser or user can defray part or all of the cost of the phone and/or service. The advertiser or user can pay a flat or variable fee to the long distance provider and/or any other service provider to defray the cost of the phone and/or service. Alternately, each advertisement or information may include an identifier, which is recognized by software or hardware in phone appliance 10 or computer 21. Thereafter, the advertiser or vendor will be charged a specified fee for the advertising or information by a service provider.

Figure 4:
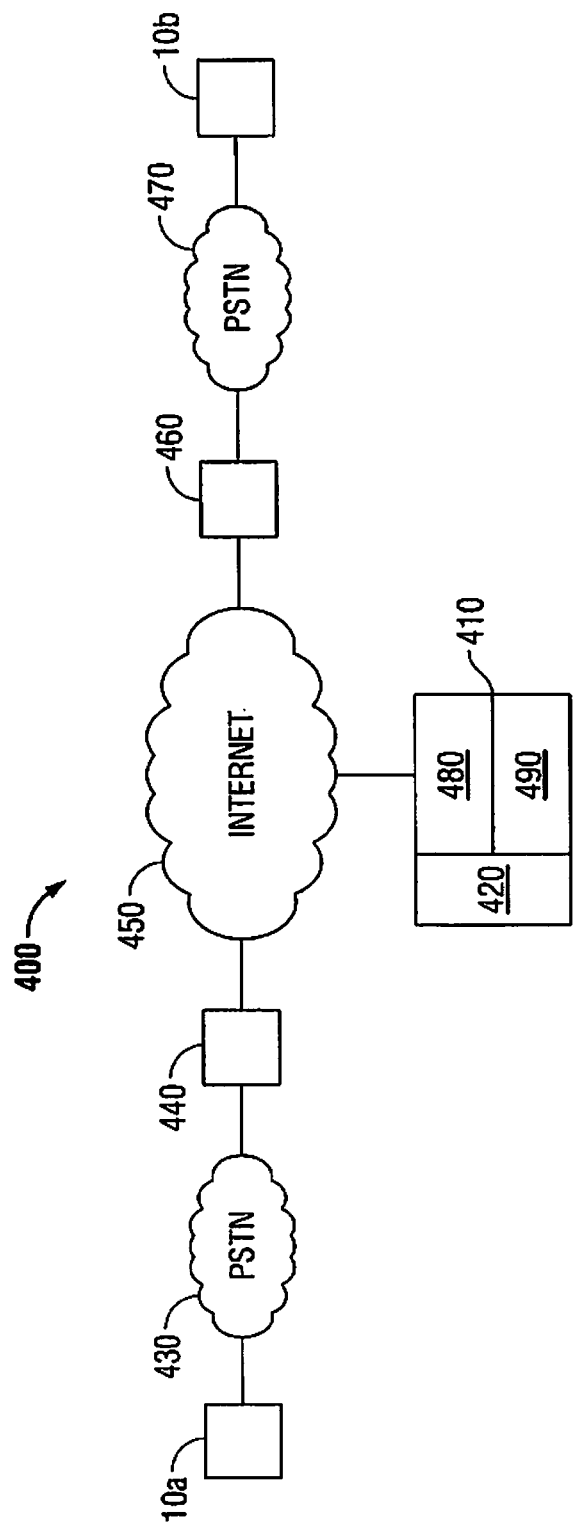
FIG. 4 is a block diagram of a system according to the present invention.

For example, with reference to FIG. 4, a service provider of a system 400 maintains a control center 410 having a database 420 storing a plurality of advertisements or information therein. Upon the establishment of a VoIP or another data type communication call between a calling party using a first phone appliance 10*a* and a called party using a second phone appliance 10*b*ata packets are transmitted along with the voice packets from one or both of the IP phones 10*a*, 10*b*. For example, the voice packets are transmitted to the opposite party via a first PSTN 430, an originating gateway 440, the Internet 450, a destination or terminating gateway 460, and a second PSTN 470, as known in the art.

On the other hand, the data packets are transmitted to the control center 410 via the first PSTN 430, the originating gateway 440, and the Internet 450, and/or the destination gateway 460, the second PSTN 470, and the Internet 450. The data packets contain a head-end for being correctly routed to the control center 410 and identifying information. The identifying information is used by the control center 410 to determine from which phone appliance 10 the data packets originated from. Once the originating phone appliance 10 is determined by the service provider, the service provider can target specific advertisements, video clips, messages, etc. stored within the database 420 to the user of the originating phone appliance 10 during the duration of the VoIP or data typed communication call. The specific advertisements, video clips, messages, etc. could be related to interests, products of interest, and other promotional information (which may be, for example, of interest to the user) to the user of the originating IP phone appliance 10 as determined by the service provider and/or user.

The service provider is able to determine the advertisements, multimedia clips, or other information to target to specific users by correlating the identifying information as received by the data packets with a user database 480. The user database 480 stores information pertaining to various users of phones appliance 10 throughout the system 400. The information stored relates to various characteristics of each user, such as age, buying habits, interests, etc. The information may be acquired by the service provider by periodically transmitting a questionnaire to the users of phones appliance 10 via the system hardware. The questionnaires are provided with routing data packets so that they reach the users of phone appliance 10. The users of phones appliance 10 answer the questionnaires and can transmit the completed questionnaires back to the control center 410. Once each questionnaire is transmitted back to the control center 410, it is provided with data packets, as noted above, for being correctly routed to the control center 410.

The system 400 may provide incentives for the users of IP phones 10 to answer the questionnaires and transmit them back to the control center 410. Such incentives could be, for example, defrayal of long distance charges when making VoIP communication calls, entrance into periodic sweepstakes, free product samples, etc.

The service provider can also acquire the information by noting which advertisements sparked an interest to respective users. The system 400 notes when a user of a phone appliance 10 clicks on or selects an advertisement or information for obtaining additional information about the company, service, product, etc. being advertised or displayed. Accordingly, it is noted that any interaction with the display or portal 16 of the phone appliance 10 by a particular user, may cause a data packet to be transmitted to the control center 410.

The data packet is appended with identifying information for identifying the particular phone appliance 10 which caused the generation and transmission of the data packet. The data packet is also provided with routing information for correctly routing the data packet to the control center 410 or other location. The generation and transmission of data packets with identifying and routing information is performed by data processing and transmission hardware and/or software, as known in the art, provided within the phone appliance 10 and/or computer 21.

It is contemplated that when the user selects an advertisement for obtaining additional information, the control center 410 sends a request to the particular vendor with the user's contact information. It is further contemplated to provide the handset of the phone appliance 10 with a button which a user can press while communicating over the VoIP data network, or other network, for indicating a response to an advertisement or other data displayed by the display screen 16.

The service provider processes the data packets received by the users providing responses to the data displayed on the phone appliance 10. The service provider then appends the user database 480 with any pertinent information related to the particular user which was obtained by processing the data packets. The system 400 is thus a VoIP or data-type communications system configured for obtaining information of interest to advertisers. such as companies, institutions, non-profit organizations, etc., while providing incentives or benefits to users for providing such information.

It is provided that the service provider can sell the information acquired of the various users of the system 400 to the advertisers, vendors, marketing companies, etc. for a fee or an exchange of goods or services. It is further provided that the control center 410 is provided with software modules having programmable instructions for being processed by one or more processors of the system 400 for performing the above-described functions and other functions.

It is provided that the control center 410 further includes a billing station 490 for receiving and processing data packets indicating the initiation and termination of VoIP communications as known in the art. Accordingly, the billing station 490 keeps track of billing information. The billing information is then transmitted to a telecommunications company for billing subscribers of the system 400.

With continued reference to FIGS. 2 and 3, phone appliance 10 also may include a plurality of function keys 24. Function keys 24 can be depressed to perform pre-selected tasks. For example, function keys may be provided to redial the last number dialed, access E-mail from the computer 21, send E-mail, send faxes, call another party, send data to a server, print file, delete a file, retrieve MP-3 files, establishing communication link with a software, etc. The function keys 24 can also be used to respond to advertisements, menus, questions, etc. appearing on the display 16.

For example, the function keys 24, as well as the alpha-numeric keypad 19, can be used to type one's e-mail address within an entry box appearing on the display 16 for transmitting the e-mail address to a vendor or to dial or complete a call to a desired advertiser. It is provided that the responses entered using the function keys 24 and the alpha-numeric keypad 19 are first transmitted to a control center, such as control center 410, operated by the service provider, before being transmitted to the appropriate vendor. The function keys 24 can also be used for transmitting an advertisement displayed to another user or to a certain e-mail address.

In a preferred embodiment, a "record" function key is provided. The record function key may be depressed to record a VoIP conversation. In doing so, the acoustic signals are converted to a corresponding analog signal which in turn is converted to digital data through an analog-to-digital converter. Thereafter, the digital data corresponding to the recorded conversation can be compressed and stored in the computer memory or on disk. Alternately, the service provider may provide a storage warehouse for storing recordings of VoIP conversations, for example, within a memory device located at the control center 410. For a fee, the recorded VoIP conversations can be transmitted to the storage warehouse via the computer 21 or directly for later use.

In another preferred embodiment of phone appliance 10, display screen or portal 16 displays advertisements 26 from local or national service providers or vendors, e.g., local take-out restaurants, etc. By pressing advertisement 26 with pointer 22, a menu or order form will be displayed on screen 16. Thereafter, a send command can be entered to place the order with the local or national service provider or vendor. Software necessary to perform these functions can be dynamically downloaded, via the computer 21, or manually installed by a user via the computer 21, or factory installed into phone 10. Each service provider would be charged a percentage of the sale by a third party vendor for use of the service. Alternately, the third party vendor can be compensated by selling or leasing the software and/or content to the service provider for a fee.

The portal 16 can be further used as an interface with various vendors, such as a brokerage firm, over a VoIP or another data communications network for allowing the user to perform various services, such as directly communicate with the vendors, purchase stocks, etc. It is provided that the communications with the various vendors can be directed through the computer 21 before being transmitted to the various vendors through VoIP or another data communications network or may be directly to VoIP or another data communication network.

It is appreciated that various software modules are provided within the phone appliance 10, the computer 21 or other device for performing the functions described above with respect to the phone appliance 10 and the system 400, such as the phone appliance 10 communicating via the RF connection with the computer 21.

It will be understood that various modifications may be made to the embodiments disclosed herein. For example, a variety of different function keys and touch pad keys may be provided to perform a variety of different tasks not specifically identified here, e.g., grocery shopping. Moreover, phone appliance 10 may include the capability for storing and/or playing music files such as MP3 music files. Therefore, the above description should not be construed as limiting, but merely as exemplification of preferred embodiments. Those skilled in the art will envision other modifications within the scope and spirit of this disclosure.

What is claimed is:

1. A phone appliance for facilitating sending voice-over-data and/or data communications, including making at least one phone call to at least one party via voice-over-the-Internet protocol (VoIP) data communications via at least one data network, said phone appliance comprising:
    means for interfacing said phone appliance with the at least one data network;
    means for transmitting and receiving the VoIP communications and the data communications; and
    a display screen for displaying at least one data communication received via the at least one data network, wherein said data communication includes at least one element of a portal;
    said phone appliance configured for Internet access for viewing Internet content and performing at least one service associated with at least one portal feature, wherein said phone appliance is further configured for user interaction and creating, displaying, and transmitting a communication, including an alpha-numeric communication, in response to the received data communication;
    wherein, when said phone appliance is operable, a time when a user initiates downloading of the at least one data communication received for display by the display screen via user interaction with the at least one element of the portal is independent of a time when the user makes the at least one phone call, and wherein said phone appliance makes the at least one phone call to the at least one party via the VoIP communications, said at least one phone call to the at least one party can be non pre-selected by the phone appliance and said at least one phone call to the at least one party can be pre-selected by the phone appliance.

2. The phone appliance according to claim 1, further comprising means for establishing a wireless communication link, including an RF communication link, for transmitting and receiving the VoIP communications and the data communications.

3. The phone appliance according to claim 1, wherein the display screen is a touch screen display, and wherein a response is generated via interaction with the appliance.

4. The phone appliance according to claim 1, further comprising means for converting analog to digital and vice versa.

5. The phone appliance according to claim 1, further comprising means for encrypting and/or decrypting data.

6. The phone appliance according to claim 1, wherein the received data communication is selected from the group consisting of an advertisement, multimedia, a video clip, an electronic message, a query, an order form, and information from at least one vendor.

7. The phone appliance according to claim 1, further comprising means for recording data.

8. The phone appliance according to claim 1, wherein the phone appliance communicates with a computing device.

9. The phone appliance according to claim 1, further comprising means for processing the VoIP communications and/or the data communications for transmission to and/or receipt from a computing device and/or a network.

10. The phone appliance according to claim 1, wherein the phone appliance further comprises means for sharing at least one resource of a computing device.

11. The phone appliance according to claim 1, further comprising means for displaying and/or transmitting a video image.

12. The phone appliance according to claim 1, wherein the phone appliance is a mobile phone device.

13. The phone appliance according to claim 1, wherein the phone appliance is configured to mimic a computing device and to perform at least one function of a computing device.

14. The phone appliance according to claim 1, wherein the display screen is a touch screen display, said touch screen display is selected from the group consisting of a liquid crystal display and a light emitting diodes display.

15. The phone appliance according to claim 1, wherein the phone appliance is configured to download data from a network, wherein the data downloaded includes software, and wherein the software is application software.

16. The phone appliance according to claim 1, wherein the phone appliance is configured for generating a response including at least one of a data packet and an analog signal.

17. The phone appliance according to claim 1, wherein the phone appliance is configured to transmit and/or receive information specific to a user and/or the phone appliance.

18. The phone appliance according to claim 1, wherein a communication in response to the received data communication includes identifying information for identifying at least one of the phone appliance and a user.

19. The phone appliance according to claim 1, wherein a communication in response to the received data communication includes routing information identifying a destination.

20. The phone appliance according to claim 1, wherein the phone appliance is configured for performing at least one function selected from the group consisting of redialing, completing a call, recording data, placing an order, accessing e-mail, accessing information, transmitting an e-mail, transmitting a facsimile, calling another party, transmitting data, storing a file, storing data, enabling a speaker function, responding to a query, indicating a response to the data displayed, printing a file, playing a music file, deleting a file, retrieving a file, establishing a communications link, responding to vendors, typing an e-mail address, purchasing securities, and shopping.

21. The phone appliance according to claim 20, wherein the music file is an MP3 file.

22. The phone appliance according to claim 1, wherein the phone appliance is configured to receive a request for information via a network.

23. The phone appliance according to claim 1, wherein the phone appliance is configured to receive targeted data via a network.

24. The phone appliance according to claim 1, wherein the phone appliance defrays at least a part of the cost associated with making communications.

25. The phone appliance according to claim 1, wherein the phone appliance is configured to compress the VoIP communications and/or the data communications.

26. The phone appliance according to claim 1, wherein the means for transmitting and receiving the VoIP communications and/or the data communications further include a digital signal processing capability.

27. The phone appliance according to claim 1, wherein the VoIP communications and/or the data communications include at least one incentive.

28. The phone appliance according to claim 1, wherein the phone appliance further comprises means for enabling at least one aspect, including at least one of a key and a touchpad of the phone appliance, to transmit and/or receive the VoIP communications and/or the data communications.

29. The phone appliance according to claim 1, wherein the means for interfacing said phone appliance with the at least one data network and the means for transmitting and receiving the VoIP communications and/or the data communications are integrated.

30. The phone appliance according to claim 1, wherein the phone appliance performs at least one gateway function.

31. The phone appliance according to claim 1, further comprising means for providing a video-phone function, including a video camera.

32. The phone appliance according to claim 1, wherein the phone appliance further comprises means for communicating with a cellular network.

33. The phone appliance according to claim 1, wherein the phone appliance accesses the at least one data network via broadband.

34. The phone appliance according to claim 1, wherein the at least one data network includes a data network, and wherein the VoIP communications and the at least one data communication received for displaying by the display screens are transmitted to the phone appliance via the data network.

35. The phone appliance according to claim 1, wherein the at least one data network includes a data network, and wherein the at least one data communication for display by the display screen and the VoIP communications are transmitted via the data network.

36. The phone appliance according to claim 1, further comprising means for utilizing a network browser program.

37. The phone appliance according to claim 1, wherein said phone appliance includes at least one phone functionality, said at least one phone functionality includes enabling a user to use a keypad with a plurality of numeric digits for selecting a combination of said digits to make the at least one phone call via the VoIP data communications.

38. The phone appliance according to claim 1, wherein said display screen is configured for the user interacting with said display screen to make the at least one phone call via VoIP.

39. A system for facilitating voice-over-data and/or data communications, including making at least one phone call to at least one party via at least one data network, including voice-over-the-Internet protocol (VoIP) data communications, the system comprising:

at least one phone appliance comprising means for interfacing said phone appliance with the at least one data network; means for transmitting and receiving the VoIP communications and the data communications; means for receiving a request for information via the at least one data network; and a display screen for displaying at least one data communication received via the at least one data network, wherein said received data communication includes at least one element of a portal; said at least one phone appliance configured for Internet access for viewing Internet content and performing at least one service associated with at least one portal feature, wherein said phone appliance is further configured for user interaction and creating, displaying, and transmitting a communication, including an alpha-numeric communication, in response to the received data communication; wherein, when said at least one phone appliance is operable, a time when at least one user initiates downloading of the at least one data communication received for display by the display screen via user interaction with the at least one element of the portal is independent of a time when the at least one user makes the at least one phone call; and a computing device configured for receiving and facilitating the VoIP communications and/or the data communications from and to the at least one phone appliance via the at least one data network, and wherein said at least one phone appliance makes the at the least one phone call to the at least one party via the VoIP communications, said at least one phone call to the at least one party can be non pre-selected by the phone appliance and said at least one phone call to the at least one party can be pre-selected by the phone appliance.

40. The system according to claim 39, wherein the received data communication is selected from the group consisting of an advertisement, multimedia, a video clip, an electronic message, a query, an order form, and information from at least one vendor.

41. The system according to claim 39, wherein the computing device is a control center, and wherein the control center provides at least one incentive, the at least one incentive includes for a service operator, vendor and/or a user to defray part or all of the cost associated with making communications.

42. The system according to claim 39, wherein the at least one phone appliance further comprises a wireless transceiver for establishing a wireless communication link, including an RF communication link, for transmitting and receiving the VoIP communications and the data communications.

43. The system according to claim 39, wherein the display screen is a touch screen display, and wherein a response is generated via interaction with the appliance.

44. The system according to claim 39, further comprising means for converting analog to digital and vice versa.

45. The system according to claim 39, further comprising means for encrypting and/or decrypting data.

46. The system according to claim 39, further comprising means for recording data.

47. The system according to claim 39, wherein the at least one phone appliance communicates with the computing device.

48. The system according to claim 39, wherein the at least one phone appliance further comprises means for sharing at least one resource of the computing device.

49. The system according to claim 39, wherein the at least one phone appliance is a mobile phone device.

50. The system according to claim 39, wherein the at least one phone appliance is configured to mimic the computing device and to perform at least one function of the computing device.

51. The system according to claim 39, wherein the display screen is a touch screen display, said touch screen display is selected from the group consisting of a liquid crystal display and a light emitting diode display.

52. The system according to claim 39, wherein the at least one phone appliance is configured to download data from a network, wherein the data downloaded includes software, and wherein the software is application software.

53. The system according to claim 39, wherein the at least one phone appliance is configured to transmit and/or receive information specific to a user and/or the at least one phone appliance.

54. The system according to claim 39, wherein a communication in response to the received data communication includes identifying information for identifying at least one of the at least one phone appliance and a user.

55. The system according to claim 39, wherein a communication in response to the received data communication includes routing information identifying a destination.

56. The system according to claim 39, wherein the at least one phone appliance is configured to enable the at least one user to provide a response to the data displayed by the display screen.

57. The system according to claim 39, wherein the at least one phone appliance is configured for performing at least one function selected from the group consisting of redialing, completing a call, recording data, placing an order, accessing e-mail, accessing information, transmitting an e-mail, transmitting a facsimile, calling another party, transmitting data, storing a file, storing data, enabling a speaker function, responding to a query, indicating a response to the data displayed, printing a file, playing a music file, deleting a file, retrieving a file, establishing a communications link, responding to vendors, typing an e-mail address, purchasing securities, and shopping.

58. The system according to claim 57, wherein the music file is an MP3 file.

59. The system according to claim 39, wherein the at least one phone appliance is configured to receive a request for information via a network.

60. The system according to claim 39, wherein the at least one phone appliance is configured to receive targeted data via a network.

61. The system according to claim 39, wherein the at least one phone appliance defrays at least a part of the cost associated with making communications.

62. The system according to claim 39, wherein the at least one phone appliance is configured to compress the VoIP communications and/or the data communications.

63. The system according to claim 39, wherein the means for transmitting and receiving the VoIP communications and/or the data communications further include a digital signal processing capability.

64. The system according to claim 39, wherein the VoIP communications and/or the data communications include at least one incentive.

65. The system according to claim 39, further comprising storage means in communication with the at least one phone appliance for receiving data from the at least one phone appliance and for storing the data.

66. The system according to claim 65, wherein the storage means include at least one of a control center, a database and a server.

67. The system according to claim 39, wherein the at least one phone appliance further comprises means for tracking information associated with at least one service provided to at least one user and/or the at least one phone appliance.

68. The system according to claim 39, wherein the at least one phone appliance further comprises means for enabling at least one aspect, including at least one of a key and a touchpad of the at least one phone appliance, to transmit and/or receive the VoIP communications and/or the data communications.

69. The system according to claim 39, wherein the means for interfacing said phone appliance with the at least one data network, the means for transmitting and receiving the VoIP communications and the data communications, and the means for receiving a request for information via the at least one data network are integrated.

70. The system according to claim 39, wherein the computing device is further configured for analyzing, processing and/or managing data received via the at least one data network.

71. The system according to claim 39, wherein the computing device is a control center, wherein the control center is further configured for maintaining at least one database correlating the data with the at least one user and/or the at least one phone appliance.

72. The system according to claim 71, wherein the at least one database correlates information, including habits, interests and/or responses of at least one user of the at least one phone appliance.

73. The system according to claim 39, wherein the at least one phone appliance performs at least one gateway function.

74. The system according to claim 39, wherein the at least one phone appliance further comprises means for communicating with a cellular network.

75. The system according to claim 39, wherein the at least one phone appliance accesses the at least one data network via broadband.

76. The system according to claim 39, wherein the at least one data network includes a data network, and wherein the VoIP communications and the at least one data communication received for displaying by the display screens are transmitted to the at least one phone appliance via the data network.

77. The system according to claim 39, wherein the at least one data network includes a data network, and wherein the at least one data communication for display by the display screen and the VoIP communications are transmitted via the data network.

78. The system according to claim 39, wherein the at least one phone appliance further comprises means for utilizing a network browser program.

79. The system according to claim 39, wherein the at least one phone appliance includes at least one phone functionality, said at least one phone functionality includes enabling a user to use a keypad with a plurality of numeric digits for selecting a combination of said digits to make the at least one phone call via the VoIP communications.

80. The system according to claim 39, wherein said display screen is configured for the user interacting with said display screen to make the at least one phone call via VoIP.

81. A method for facilitating voice-over-data and/or data communications, comprising the steps of:
establishing a communication link with at least one data network using a phone appliance for making at least one phone call to at least one party via the at least one data network, including transmitting and receiving voice-over-the-Internet protocol (VoIP) communications and data communications;
receiving by the phone appliance at least one data communication for display, wherein said data communication includes Internet content;
displaying by the phone appliance the at least one data communication received via the data network; and
transmitting by the phone appliance a communication, including an alpha-numeric communication, in response to the received data communication, wherein said phone appliance is configured for Internet access for viewing the Internet content and for user interaction and creating, displaying, and transmitting said alpha-numeric communication, wherein, when said phone appliance is operable, a time when a user initiates downloading of the at least one data communication received for display by the phone appliance via user interaction with the Internet content is independent of a time when the user makes the at least one phone call, and wherein said phone appliance makes the at least one phone call to the at least one party via the VoIP communications, said at least one phone call to the at least one party can be non pre-selected by the phone appliance and said at least one phone call to the at least one party can be pre-selected by the phone appliance.

82. The method according to claim 81, wherein the step of establishing a communication link further comprises the step of establishing a wireless communication link, including a RF communication link, for transmitting and receiving the VoIP communications and the data communications.

83. The method according to claim 81, wherein the step of the phone appliance displaying further comprises the step of displaying data on a touch screen display screen of the phone appliance, and wherein the step of responding further comprises the step of interfacing with the appliance.

84. The method according to claim 81, wherein the received data communication is selected from the group consisting of an advertisement, multimedia, a video clip, an electronic message, a query, an order form, and information from at least one vendor.

85. The method according to claim 81, wherein the phone appliance further comprises the step of recording data.

86. The method according to claim 81, wherein the phone appliance comprises a wireless transceiver.

87. The method according to claim 81, wherein the phone appliance comprises a port.

88. The method according to claim 81, wherein the step of the phone appliance transmitting the communication comprises the step of transmitting and/or receiving the VoIP communications and/or the data communications via user-selection of at least one of a key and a touchpad of the phone appliance.

89. The method according to claim 81, further comprising the step of the phone appliance converting analog to digital and vice versa.

90. The method according to claim 81, further comprising the step of encrypting and/or decrypting data.

91. The method according to claim 81, further comprising the step of tracking billing information associated with at least one service provided to at least one user and/or the phone appliance.

92. The method according to claim 81, further comprising the step of correlating information received from the phone appliance with a database.

93. The method according to claim 81, further comprising the step of the phone appliance communicating with a computing device.

94. The method according to claim 93, wherein the computing device is a computer.

95. The method according to claim 81, further comprising the step of the phone appliance processing the VoIP communications and the data communications for transmission to and/or receipt from a computing device and/or a network.

96. The method according to claim 81, further comprising the step of the phone appliance sharing at least one resource of a computing device.

97. The method according to claim 81, further comprising the step of the phone appliance connecting to an external device.

98. The method according to claim 97, wherein the connection to the external device is wireless.

99. The method according to claim 81, further comprising the step of the phone appliance displaying and/or transmitting video.

100. The method according to claim 81, further comprising the step of the phone appliance communicating via a GSM network.

101. The method according to claim 81, wherein the phone appliance is a mobile phone device.

102. The method according to claim 81, further comprising the steps of the phone appliance mimicking a computing device and performing at least one function of the computing device.

103. The method according to claim 81, wherein the phone appliance comprises a display screen, said display screen is a touch screen display selected from the group consisting of a liquid crystal display and a light emitting diode display.

104. The method according to claim 81, further comprising the step of the phone appliance downloading data from a network.

105. The method according to claim 104, wherein the data downloaded includes software.

106. The method according to claim 105, wherein the software is application software.

107. The method according to claim 81, wherein the phone appliance is configured for generating a response including at least one of a data packet and an analog signal.

108. The method according to claim 81, further comprising the step of the phone appliance transmitting and/or receiving information specific to at least one of a user and the phone appliance.

109. The method according to claim 81, wherein a communication in response to the received data communication includes identifying information for identifying at least one of the phone appliance and a user.

110. The method according to claim 81, wherein a communication in response to the received data communication includes routing information identifying a destination.

111. The method according to claim 81, wherein the phone appliance further comprises a handset for facilitating the VoIP communications and the data communications.

112. The method according to claim 81, wherein the phone appliance is configured for performing at least one function selected from the group consisting of redialing, completing a call, recording data, placing an order, accessing e-mail, accessing information, transmitting an e-mail, transmitting a facsimile, calling another party, transmitting data, storing a file, storing data, enabling a speaker function, responding to a query, indicating a response to the data displayed, printing a file, playing a music file, deleting a file, retrieving a file, establishing a communications link, responding to vendors, typing an e-mail address, purchasing securities, and shopping.

113. The method according to claim 112, wherein the music file is an MP3 file.

114. The method according to claim 81, further comprising the step of the phone appliance receiving a request for information via a network.

115. The method according to claim 81, further comprising the step of the phone appliance receiving targeted data via a network.

116. The method according to claim 81, further comprising the step of defraying at least a part of the cost associated with making communications.

117. The method according to claim 81, further comprising the step of the phone appliance compressing the VoIP communications and/or the data communications.

118. The method according to claim 81, further comprising the step of processing the VoIP communications and the data communications.

119. The method according to claim 118, wherein the step of processing the VoIP communications and/or the data communications comprises the step of using a digital signal processor.

120. The method according to claim 81, further comprising the step of receiving and/or transmitting at least one incentive via the VoIP communications and/or the data communications.

121. The method according to claim 81, wherein the step of the phone appliance receiving data and the step of transmitting the communication in response to the received data communication include at least receiving and transmitting data packets, respectively.

122. The method according to claim 121, wherein the data packets are at least one of digital and analog.

123. The method according to claim 81, wherein the at least one data network comprises the Internet and the at least one data network is configured for transmitting and/or receiving data packets.

124. The method according to claim 81, further comprising the step of configuring the phone appliance to enable a user to provide a response to the data displayed by a display screen of the phone appliance.

125. The method according to claim 81, further comprising the step of storing data within a computing device in operative communication with the phone appliance and/or within the phone appliance.

126. The method according to claim 81, further comprising the step of interfacing the phone appliance with the at least one data network.

127. The method according to claim 81, further comprising the step of performing at least one gateway function.

128. The method according to claim 81, further comprising the step of the phone providing a video-phone function.

129. The method according to claim 81, wherein the step of establishing a communication link further comprises communicating with a cellular network.

130. The method according to claim 129, wherein the cellular network is a GSM cellular network.

131. The method according to claim 81, wherein the step of establishing a communication link further comprises accessing the at least one data network via broadband.

132. The method according to claim 81, further comprising the step of the phone appliance providing a video function.

133. The method according to claim 81, wherein the at least one data network includes a data network, and wherein the VoIP communications, and the at least one data communication received for displaying, are transmitted to the phone appliance via the data network.

134. The method according to claim 81, wherein the at least one data network includes a data network, and wherein the at least one data communication for display by the phone appliance and the VoIP communications are transmitted via the data network.

135. The method according to claim 81, further comprising the step of the phone appliance utilizing a network browser program.

136. The method according to claim 81, wherein said phone appliance includes at least one phone functionality, said at least one phone functionality includes enabling a user to use a keypad with a plurality of numeric digits for selecting a combination of said digits to make the at least one phone call via the VoIP communications.

137. The method according to claim 81, further comprising the step of software receiving and transmitting email.

138. The method according to claim 81, wherein said phone appliance includes a display screen configured for the user interacting with said display screen to make the at least one phone call via VoIP.

139. A phone appliance for facilitating sending voice-over-data and/or data communications, including making at least one phone call to at least one party via voice-over-the-Internet protocol (VoIP) data communications via at least one data network, said phone appliance comprising:
- a transceiver for transmitting and receiving the VoIP communications and the data communications via the at least one data network;
- a display screen for displaying at least one data communication received via the at least one data network, wherein said at least one data communication includes Internet content; and
- software downloaded via the Internet for adding at least one additional function to said phone appliance;
- said phone appliance configured for Internet access for viewing the Internet content and performing at least one service associated with the Internet content, wherein said phone appliance is further configured for generating a response to the received VoIP communications and/or the data communications and for transmitting the response, wherein, when said phone appliance is operable, a time when a user initiates downloading of the at least one data communication received for display by the display screen via user interaction with the Internet content is independent of a time when the user makes the at least one phone call, and wherein said phone appliance makes the at least one phone call to the at least one party via the VoIP communications, said at least one phone call to the at least one party can be non pre-selected by the phone appliance and said at least one phone call to the at least one party can be pre-selected by the phone appliance.

140. The phone appliance according to claim 139, wherein the at least one data network includes a data network, and wherein the VoIP communications, and the at least one data communication for display by the display screen, are transmitted via the data network.

141. The phone appliance according to claim 139, further comprising circuitry for establishing a wireless communication link, including an RF communication link, for transmitting and receiving the VoIP communications and the data communications.

142. The phone appliance according to claim 139, wherein the display screen is a touch screen display, and wherein a response is generated via user interaction with the touch screen display.

143. The phone appliance according to claim 139, further comprising software for encrypting and/or decrypting data.

144. The phone appliance according to claim 139, wherein the data communication is selected from the group consisting of an advertisement, multimedia, a video clip, an electronic message, a query, an order form, and information from at least one vendor.

145. The phone appliance according to claim 139, further comprising software for recording data.

146. The phone appliance according to claim 139, wherein the phone appliance communicates with a computing device.

147. The phone appliance according to claim 139, further comprising software for processing the VoIP communications and/or the data communications for transmission to and/or receipt from a computing device and/or a network.

148. The phone appliance according to claim 139, wherein the phone appliance further comprises software for sharing at least one resource of a computing device.

149. The phone appliance according to claim 139, further comprising software for providing a video function.

150. The phone appliance according to claim 139, further comprising software for displaying and/or transmitting a video image.

151. The phone appliance according to claim 139, wherein the phone appliance is a mobile phone device.

152. The phone appliance according to claim 139, wherein the phone appliance is configured to mimic a computing device and to perform at least one function of the computing device.

153. The phone appliance according to claim 139, wherein the display screen is a touch screen display selected from the group consisting of a liquid crystal display and a light emitting diode display.

154. The phone appliance according to claim 139, wherein software downloaded includes application software.

155. The phone appliance according to claim 139, wherein a response to the received VoIP communications and/or the data communications includes identifying information for identifying at least one of the phone appliance and a user.

156. The phone appliance according to claim 139, further comprising at least one key for performing at least one task and/or function including transmitting and/or receiving the Internet content.

157. The phone appliance according to claim 139, wherein the phone appliance is configured for performing at least one function selected from the group consisting of redialing, completing a call, recording data, placing an order, accessing e-mail, accessing information, transmitting an e-mail, transmitting a facsimile, calling another party, transmitting data, storing a file, storing data, enabling a speaker function, responding to a query, indicating a response to the data displayed, printing a file, playing a music file, deleting a file, retrieving a file, establishing a communications link, responding to vendors, typing an e-mail address, purchasing securities, and shopping.

158. The phone appliance according to claim 157, wherein the music file is an MP3 file.

159. The phone appliance according to claim 139, wherein the phone appliance defrays at least a part of the cost associated with making communications.

160. The phone appliance according to claim 139, wherein the phone appliance is configured to compress the VoIP communications and/or the data communications.

161. The phone appliance according to claim 139, further comprising a digital signal processing capability for processing the VoIP communications and/or the data communications.

162. The phone appliance according to claim 139, wherein the phone appliance performs at least one gateway function.

163. The phone appliance according to claim 139, wherein the phone appliance further comprises circuitry for communicating with a cellular network.

164. The phone appliance communications device according to claim 163, wherein the cellular network is a GSM cellular network.

165. The phone appliance communications device according to claim 139, wherein the phone appliance accesses the at least one data network via broadband.

166. The phone appliance according to claim 139, further comprising software for receiving and transmitting email.

167. The phone appliance according to claim 139, wherein the phone appliance includes at least one phone functionality, said at least one phone functionality includes enabling a user to use a keypad with a plurality of numeric digits for selecting a combination of said digits to make the at least one phone call via the VoIP communications.

168. The phone appliance according to claim 139, wherein said display screen is configured for the user interacting with said display screen to make the at least one phone call via VoIP.

169. A system for facilitating voice-over-data and/or data communications over at least one data network including making at least one phone call to at least one party via voice-over-the-Internet protocol (VoIP) data communications, the system comprising:

at least one phone appliance comprising a transceiver for transmitting and receiving the VoIP communications and the data communications via the at least one data network; a display screen for displaying at least one data communication received via the at least one data network, wherein said at least one data communication received includes Internet content; and software downloaded via the Internet for adding at least one additional function to said phone appliance; said phone appliance configured for Internet access for viewing the Internet content and performing at least one service associated with the Internet content, and further configured for generating a response to the received data communication and for transmitting the response, wherein, when said at least one phone appliance is operable, a time when at least one user initiates downloading of the at least one data communication received for display by the display screen via user interaction with the Internet content is independent of a time when the at least one user makes the at least one phone call; and a computing device configured for receiving and facilitating the VoIP communications and/or the data communications from and to the at least one phone appliance via the at least one data network, wherein said at least one phone appliance makes the at least one phone call to the at least one party via the VoIP communications, said at least one phone call to the at least one party can be non pre-selected by the phone appliance and said at least one phone call to the at least one party can be pre-selected by the phone appliance.

170. The system according to claim 169, wherein the at least one data network includes a data network, and wherein the VoIP communications, and the at least one data communication for display, are transmitted via the data network.

171. The system according to claim 169, wherein the at least one phone appliance further comprises circuitry for establishing a wireless communication link, including an RF communication link, for transmitting and receiving the VoIP communications and the data communications.

172. The system according to claim 169, wherein the display screen is a touch screen display, and wherein a response is generated via user interaction with the touch screen display.

173. The system according to claim 169, wherein the at least one phone appliance further comprises software for encrypting and/or decrypting data.

174. The system according to claim 169, wherein the data communication is selected from the group consisting of advertisements, multimedia, video clips, electronic messages, queries, order forms, and information from at least one vendor.

175. The system according to claim 169, wherein the at least one phone appliance further comprises software for recording data.

176. The system according to claim 169, wherein the at least one phone appliance communicates with the computing device.

177. The system according to claim 169, wherein the at least one phone appliance further comprises circuitry for processing the VoIP communications and/or the data communications for transmission to and/or receipt from the computing device and/or a network.

178. The system according to claim 169, wherein the at least one phone appliance further comprises software for sharing at least one resources of the computing device.

179. The system according to claim 169, wherein the at least one phone appliance further comprises software for providing a video function.

180. The system according to claim 169, wherein the at least one phone appliance further comprises software for displaying and/or transmitting a video image.

181. The system according to claim 169, wherein the at least one phone appliance is a mobile phone device.

182. The system according to claim 169, wherein the at least one phone appliance is configured to mimic a computing device and to perform at least one function of the computing device.

183. The system according to claim 169, wherein the display screen is a touch screen display selected from the group consisting of a liquid crystal display and light emitting diode display.

184. The system according to claim 169, wherein the software downloaded includes application software.

185. The system according to claim 169, wherein the communication in response to the received data communication includes identifying information for identifying at least one of the at least one phone appliance and a user.

186. The system according to claim 169, wherein the at least one phone appliance further comprises at least one key for performing at least one task and/or function including transmitting and/or receiving the Internet content.

187. The system according to claim 169, wherein the at least one phone appliance is configured for performing at least one function selected from the group consisting of redialing, completing a call, recording data, placing an order, accessing e-mail, accessing information, transmitting an e-mail, transmitting a facsimile, calling another party, transmitting data, storing a file, storing data, enabling a speaker function, responding to a query, indicating a response to the data displayed, printing a file, playing a music file, deleting a file, retrieving a file, establishing a communications link, responding to vendors, typing an e-mail address, purchasing securities, and shopping.

188. The system according to claim 187 wherein the music file is an MP3 file.

189. The system according to claim 169, wherein the at least one phone appliance defrays at least a part of the cost associated with making communications.

190. The system according to claim 169, wherein the at least one phone appliance is configured to compress the VoIP communications and/or the data communications.

191. The system according to claim 169, wherein the at least one phone appliance further comprises a digital signal processing capability for processing the VoIP communications and/or the data communications.

192. The system according to claim 169, wherein the at least one phone appliance performs at least one gateway function.

193. The system according to claim 169, wherein the at least one phone appliance further comprises circuitry for communicating with a cellular network.

194. The system according to claim 193, wherein the cellular network is a GSM cellular network.

195. The system according to claim 169, wherein the at least one phone appliance accesses the at least one data network via broadband.

196. The system according to claim 169, wherein the at least one phone appliance further comprises software for receiving and transmitting email.

197. The system according to claim 169, wherein the at least one phone appliance includes at least one phone functionality, said at least one phone functionality includes enabling a user to use a keypad with a plurality of numeric digits for selecting a combination of said digits to make the at least one phone call via the VoIP communications.

198. The system according to claim 169, wherein said display screen is configured for the user interacting with said display screen to make the at least one phone call via VoIP.

199. A system for facilitating voice-over-data and/or data communications, including making at least one phone call to at least one party via voice-over-the-Internet protocol (VoIP) data communications, the system comprising:
at least one data network, including the Internet, for routing the VoIP communications and the data communications; and
a computing device in operative communication with the at least one data network for transmitting to and receiving from the at least one data network the VoIP communications and the data communications, said computing device configured to provide a connection to at least one user-operable phone appliance to facilitate the transmission and/or the receipt of the VoIP communications and the data communications between the computing device and the at least one user-operable phone appliance, the at least one user-operable phone appliance configured for Internet access for viewing Internet content, wherein at least one communication transmitted by the computing device includes video and the at least one communication transmitted is configured for display by the at least one user-operable phone appliance, wherein, when said at least one user-operable phone appliance is operable, a user initiates downloading of the at least one communication transmitted for display by the at least one user-operable phone appliance via user interaction with the Internet content, and wherein said at least one user-operable phone appliance makes the at least one phone call to the at least one party via the VoIP communications, said at least one phone call to the at least one party can be non pre-selected by the at least one user-operable phone appliance and said at least one phone call to the at least one party can be pre-selected by the at least one user-operable phone appliance.

200. The system according to claim 199, wherein the at least one data network includes a data network, and wherein the VoIP communications, and the at least one communication configured for display, are transmitted via the data network.

201. The system according to claim 199, wherein the at least one user-operable phone appliance comprises a transceiver for establishing a wireless communication link, including an RF communication link, for transmitting and receiving the VoIP communications and the data communications.

202. The system according to claim 199, wherein the at least one user-operable phone appliance comprises a touch screen display, and wherein a response is generated via user interaction with the touch screen display.

203. The system according to claim 199, wherein the at least one user-operable phone appliance comprises a wireless transceiver.

204. The system according to claim 199, wherein the at least one user-operable phone appliance comprises software for encrypting and/or decrypting data.

205. The system according to claim 199, wherein the at least one received data communication is selected from the group consisting of advertisements, multimedia, video clips, electronic messages, queries, order forms, and information from at least one vendor.

206. The system according to claim 199, wherein the at least one user-operable phone appliance comprises software for recording data.

207. The system according to claim 199, wherein the at least one user-operable phone appliance communicates with the computing device.

208. The system according to claim 199, wherein the at least one user-operable phone appliance comprises circuitry for processing the VoIP communications and/or the data communications for transmission to and/or receipt from the computing device and/or a network.

209. The system according to claim 199, wherein the at least one user-operable phone appliance comprises software for sharing at least one resource of the computing device.

210. The system according to claim 199, wherein the at least one user-operable phone appliance comprises software for providing a video function.

211. The system according to claim 199, wherein the at least one user-operable phone appliance comprises software for displaying and/or transmitting a video image.

212. The system according to claim 199, wherein the at least one user-operable phone appliance is a mobile phone device.

213. The system according to claim 199, wherein the at least one user-operable phone appliance is configured to mimic a computing device and to perform at least one function of the computing device.

214. The system according to claim 199, wherein the at least one user-operable phone appliance comprises a display screen, said display screen is a touch screen display selected from the group consisting of a liquid crystal display and a light emitting diode display.

215. The system according to claim 199, wherein the at least one communication includes software, and wherein the software is application software.

216. The system according to claim 199, wherein, when said at least one user-operable phone appliance is operable, a time when a user initiates downloading of the at least one communication transmitted for display by said at least one user-operable phone appliance via user interaction with the Internet content is independent of a time when the user makes the at least one phone call.

217. The system according to claim 199, wherein the data communications include identifying information for identifying at least one of the at least one user-operable phone appliance and a user.

218. The system according to claim 199, wherein the at least one user-operable phone appliance comprises at least one key for performing at least one task and/or function including transmitting and/or receiving the Internet content.

219. The system according to claim 199, wherein the at least one user-operable phone appliance is configured for performing at least one function selected from the group consisting of redialing, completing a call, recording data, placing an order, accessing e-mail, accessing information, transmitting an e-mail, transmitting a facsimile, calling another party, transmitting data, storing a file, storing data, enabling a speaker function, responding to a query, indicating a response to the data displayed, printing a file, playing a music file, deleting a file, retrieving a file, establishing a communications link, responding to vendors, typing an e-mail address, purchasing securities, and shopping.

220. The system according to claim 219, wherein the music file is an MP3 file.

221. The system according to claim 199, wherein the at least one user-operable phone appliance defrays at least a part of the cost associated with making communications.

222. The system according to claim 199, wherein the at least one user-operable phone appliance is configured to compress the VoIP communications and/or the data communications.

223. The system according to claim 199, wherein the at least one user-operable phone appliance comprises circuitry for transmitting and receiving the VoIP communications and/or the data communications from and/or to the computing device.

224. The system according to claim 199, wherein the at least one user-operable phone appliance performs at least one gateway function.

225. The system according to claim 199, wherein the at least one user-operable phone appliance further comprises circuitry for communicating with a cellular network.

226. The system according to claim 225, wherein the cellular network is a GSM cellular network.

227. The system according to claim 199, wherein the at least one user-operable phone appliance accesses the at least one data network via broadband.

228. The system according to claim 199, wherein the at least one user-operable phone appliance comprises software for receiving and transmitting email.

229. The system according to claim 199, wherein said at least one user-operable phone appliance includes at least one phone functionality, said at least one phone functionality includes enabling a user to use a keypad with a plurality of numeric digits for selecting a combination of said digits to make the at least one phone call via the VoIP communications.

230. The system according to claim 199, wherein said phone appliance includes a display screen configured for the user interacting with said display screen to make the at least one phone call via VoIP.

231. A method for facilitating voice-over-data, and/or data communications, including making at least one phone call to at least one party via voice-over-the-Internet protocol (VoIP) data communications via at least one data network, comprising the steps of:
providing a connection between a computing device and at least one phone appliance, said connection facilitating display of the data communications by said at least one phone appliance;
receiving, via the connection, the VoIP communications, and the data communications for displaying, by the at least one phone appliance;
transmitting the VoIP communications, and the data communications for displaying, by the at least one phone appliance, wherein the at least one phone appliance is configured for Internet access for viewing Internet content, and wherein, when said at least one phone appliance is operable, a time when a user initiates downloading data communications for display by the at least one phone appliance via user interaction with the Internet content is independent of a time when the user makes the at least one phone call;
transmitting software to the at least one phone appliance, via the Internet, for adding at least one additional function to said at least one phone appliance; and
receiving data transmitted by the at least one phone appliance, and wherein said at least one phone appliance makes the at least one phone call to the at least one party via the VoIP communications, said at least one phone call to the at least one party can be non pre-selected by the phone appliance and said at least one phone call to the at least one party can be pre-selected by the phone appliance.

232. The method according to claim 231, wherein the at least one data network includes a data network, and wherein the VoIP communications, and at least one data communication for display, are transmitted via the data network.

233. The method according to claim 222, wherein the step of providing a connection between the computing device and the at least one phone appliance further comprises the step of providing a wireless communication link, including a RF communication link, for transmitting and receiving the VoIP communications and the data communications.

234. The method according to claim 222, wherein the at least one phone appliance comprises a display screen, the display screen is a touch screen display screen, and wherein the at least one phone appliance displays data on the touch screen display screen.

235. The method according to claim 222, wherein the at least one phone appliance comprises a wireless transceiver.

236. The method according to claim 222, further comprising the step of encrypting and/or decrypting data.

237. The method according to claim 222, wherein the data communications are selected from the group consisting of an advertisement, multimedia, a video clip, an electronic message, a query, an order form, and information from at least one vendor.

238. The method according to claim 222, further comprising the step of the at least one phone appliance recording data.

239. The method according to claim 222, further comprising the step of the at least one phone appliance communicating with the computing device.

240. The method according to claim 222, further comprising the step of the at least one phone appliance processing the VoIP communications and the data communications for transmission to and/or receipt from the computing device and/or the at least one data network.

241. The method according to claim 222, further comprising the step of the at least one phone appliance sharing at least one resource of a computing device.

242. The method according to claim 222, further comprising the step of the at least one phone appliance providing a video function.

243. The method according to claim 222, further comprising the step of the at least one phone appliance displaying and/or transmitting video.

244. The method according to claim 222, wherein the at least one phone appliance is a mobile phone device.

245. The method according to claim 222, further comprising the steps of the at least one phone appliance mimicking a computing device and performing at least one function of the computing device.

246. The method according to claim 222, wherein the at least one phone appliance comprises a display screen, said display screen is a touch screen display screen selected from the group consisting of a liquid crystal display and a light emitting diode display.

247. The method according to claim 222, further comprising the step of the at least one phone appliance downloading data from the at least one data network, wherein the data downloaded includes software, and wherein the software is application software.

248. The method according to claim 222, wherein a communication in response to the received VoIP communications and/or the data communications includes identifying information for identifying the at least one phone appliance and a user.

249. The method according to claim 222, wherein the at least one phone appliance is configured for performing at least one function selected from the group consisting of redialing, completing a call, recording data, placing an order, accessing e-mail, accessing information, transmitting an e-mail, transmitting a facsimile, calling another party, transmitting data, storing a file, storing data, enabling a speaker function, responding to a query, indicating a response to the data displayed, printing a file, playing a music file, deleting a file, retrieving a file, establishing a communications link, responding to vendors, typing an e-mail address, purchasing securities, and shopping.

250. The method according to claim 249, wherein the music file is an MP3 file.

251. The method according to claim 222, further comprising the step of defraying at least a part of the cost associated with making communications.

252. The method according to claim 222, further comprising the step of configuring the at least one phone appliance to compress the VoIP communications and/or the data communications.

253. The method according to claim 222, further comprising the step of processing the VoIP communications and/or the data communications using a digital signal processor.

254. The method according to claim 222, further comprising the step of performing at least one gateway function.

255. The method according to claim 222, wherein the step of providing a connection further comprises communicating with a cellular network.

256. The method according to claim 255, wherein the cellular network is a GSM cellular network.

257. The method according to claim 222, wherein the step of providing a connection further comprises accessing the at least one data network via broadband.

258. The method according to claim 222, further comprising the step of software receiving and transmitting email.

259. The method according to claim 231, wherein the at least one phone appliance includes at least one phone functionality, said at least one phones functionality includes enabling a user to use a keypad with a plurality of numeric digits for selecting a combination of said digits to make the at least one phone call via the VoIP communications.

260. The method according to claim 231, wherein said phone appliance includes a display screen configured for the user interacting with said display screen to make the at least one phone call via VoIP.

261. A method for facilitating voice-over-data and/or data communications, including making at least one phone call to at least one party via voice-over-the-Internet protocol (VoIP) data communications via at least one data network, comprising the steps of:
providing an RF connection, wherein the RF connection connects a computing device and a phone appliance, said phone appliance configured for receiving data for display via the at least one data network;
receiving the VoIP communications, and the data communications for displaying, by the phone appliance;
the VoIP communications and the data communications being received by the computing device from the phone appliance via the RF connection;
transmitting the VoIP communications, and the data communications for display, by the phone appliance;
the data communications being transmitted from the computing device to the phone appliance via the RF connection, wherein the phone appliance is configured for Internet access for viewing Internet content and at least one data communication transmitted to the phone appliance includes at least one element of a portal, and wherein, when said phone appliance is operable, a user initiates downloading data communications for display by the phone appliance via user interaction with the at least one element of the portal;
transmitting software via the Internet, wherein the software is transmitted to the phone appliance for adding at least one additional function to said phone appliance; and
receiving data by the computing device, the received data being transmitted by the phone appliance in response to the received VoIP communications and/or the data communications, and wherein said phone appliance makes the at least one phone call to the at least one party via the VoIP communications, said at least one phone call to the at least one party can be non pre-selected by the phone appliance and said at least one phone call to the at least one party can be pre-selected by the phone appliance.

262. The method according to claim 261, wherein the at least one data network includes a data network, and wherein the VoIP communications, and the at least one data communication for display, are transmitted via the data network.

263. The method according to claim 261, wherein the step of providing an RF connection further comprises the step of providing a wireless communication link via a transceiver for transmitting and receiving the VoIP communications and the data communications.

264. The method according to claim 261, wherein the phone appliance displays data on a touch screen display screen.

265. The method according to claim 261, further comprising the step of encrypting and/or decrypting data.

266. The method according to claim 261, wherein the data communications are selected from the group consisting of an advertisement, multimedia, a video clip, an electronic message, a query, an order form, and information from at least one vendor.

267. The method according to claim 261, further comprising the step of the phone appliance recording data.

268. The method according to claim 261, further comprising the step of the phone appliance communicating with the computing device.

269. The method according to claim 261, further comprising the step of the phone appliance processing the VoIP communications and the data communications for transmission to and/or receipt from the computing device and/or the at least one data network.

270. The method according to claim 261, further comprising the step of the phone appliance sharing at least one resource of a computing device.

271. The method according to claim 261, further comprising the step of the phone appliance providing a video function.

272. The method according to claim 261, further comprising the step of the phone appliance displaying and/or transmitting video.

273. The method according to claim 261, wherein the phone appliance is a mobile phone device.

274. The method according to claim 261, further comprising the steps of the phone appliance mimicking a computing device and performing at least one function of the computing device.

275. The method according to claim 261, wherein the phone appliance comprises a display screen, said display screen is a touch screen display screen selected from the group consisting of a liquid crystal display and a light emitting diode display.

276. The method according to claim 261, further comprising the step of the phone appliance downloading data from the at least one data network, wherein the data downloaded includes software, and wherein the software is application software.

277. The method according to claim 261, wherein, when said phone appliance is operable, a time when a user initiates downloading of the data communications transmitted for display by the phone appliance via user interaction with the Internet content is independent of a time when the user makes the at least one phone call.

278. The method according to claim 261, wherein a communication in response to the received VoIP communications and/or the data communications includes identifying information for identifying the phone appliance and a user.

279. The method according to claim 261, wherein the phone appliance is configured for performing at least one function selected from the group consisting of redialing, completing a call, recording data, placing an order, accessing e-mail, accessing information, transmitting an e-mail, transmitting a facsimile, calling another party, transmitting data, storing a file, storing data, enabling a speaker function, responding to a query, indicating a response to the data displayed, printing a file, playing a music file, deleting a file, retrieving a file, establishing a communications link, responding to vendors, typing an e-mail address, purchasing securities, and shopping.

280. The method according to claim 279, wherein the music file is an MP3 file.

281. The method according to claim 261, further comprising the step of defraying at least a part of the cost associated with making communications.

282. The method according to claim 261, further comprising the step of the phone appliance compressing the VoIP communications and/or the data communications.

283. The method according to claim 261, further comprising the step of processing the VoIP communications and/or the data communications using a digital signal processor.

284. The method according to claim 261, further comprising the step of performing at least one gateway function.

285. The method according to claim 261, wherein the step of providing an RF connection further comprises the step of communicating with a cellular network.

286. The method according to claim 285, wherein the cellular network is a GSM cellular network.

287. The method according to claim 261, further comprising the step of software in the phone appliance transmitting and receiving email.

288. The method according to claim 261, wherein the phone appliance includes at least one phone functionality, said at least one phone functionality includes enabling a user to use a keypad with a plurality of numeric digits for selecting a combination of said digits to make the at least one phone call via the VoIP communications.

289. The method according to claim 261, wherein said phone appliance includes a display screen configured for the user interacting with said display screen to make the at least one phone call via VoIP.

290. A phone appliance for facilitating sending voice-over-data and/or data communications, including making at least one phone call to at least one party via voice-over-the-Internet protocol (VoIP) data communications via at least one data network, said phone appliance comprising:

a transceiver for interfacing said phone appliance with the at least one data network, wherein the transceiver transmits and receives the VoIP communications and the data communications; and a display screen for displaying at least one communication received via the at least one data network, wherein said at least one communication received includes Internet content;

said phone appliance configured for Internet access for viewing the Internet content and performing at least one service associated with the Internet content, wherein said phone appliance is further configured for user interaction and creating and displaying a communication, including an alpha-numeric communication, in response to the received communication, and for transmitting the alpha-numeric communication;

wherein, when said phone appliance is operable, said phone appliance is configured for a user to initiate downloading of the at least one communication received for display by the display screen via user interaction with the display screen; and wherein the at least one data network includes a data network, and wherein the VoIP communications, and the at least one communication for displaying, are transmitted via the data network, and wherein said phone appliance makes the at least one phone call to the at least one party via the VoIP communications, said at least one phone call to the at least one party can be non pre-selected by the phone appliance and said at least one phone call to the at least one party can be pre-selected by the phone appliance.

291. The phone appliance according to claim 290, further comprises circuitry for establishing a wireless communication link, including an RF communication link, for transmitting and receiving the VoIP communications and the data communications via the transceiver.

292. The phone appliance according to claim 290, wherein the display screen is a touch screen display, and wherein a response is generated via user interaction with the touch screen display.

293. The phone appliance according to claim 290, further comprising software for encrypting and/or decrypting data.

294. The phone appliance according to claim 290, wherein the at least one communication is selected from the group consisting of an advertisement, multimedia, a video clip, an electronic message, a query, an order form, and information from at least one vendor.

295. The phone appliance according to claim 290, further comprising software for recording data.

296. The phone appliance according to claim 290, wherein the phone appliance communicates with a computing device.

297. The phone appliance according to claim 290, further comprising software for processing the VoIP communications and/or the data communications for transmission to and/or receipt from a computing device and/or a network.

298. The phone appliance according to claim 290, wherein the phone appliance further comprises software for sharing at least one resource of a computing device.

299. The phone appliance according to claim 290, further comprising software for providing a video function.

300. The phone appliance according to claim 290, further comprising software for displaying and/or transmitting a video image.

301. The phone appliance according to claim 290, wherein the phone appliance is a mobile phone device.

302. The phone appliance according to claim 290, wherein the phone appliance is configured to mimic a computing device and to perform at least one function of the computing device.

303. The phone appliance according to claim 290, wherein the display screen is a touch screen display, said touch screen display is selected from the group consisting of a liquid crystal display and a light emitting diode display.

304. The phone appliance according to claim 290, wherein the at least one communication downloaded includes software, and wherein the software is application software.

305. The phone appliance according to claim 290, wherein, when said phone appliance is operable, a time when a user initiates downloading of the at least one communication received for display by the display screen via user interaction with the Internet content is independent of a time when the user makes the at least one phone call.

306. The phone appliance according to claim 290, wherein a communication in response to the received at least one communication includes identifying information for identifying at least one of the phone appliance and a user.

307. The phone appliance according to claim 290, further comprising at least one key for performing at least one task and/or function including transmitting and/or receiving the Internet content.

308. The phone appliance according to claim 290, wherein the phone appliance is configured for performing at least one function selected from the group consisting of redialing, completing a call, recording data, placing an order, accessing e-mail, accessing information, transmitting an e-mail, transmitting a facsimile, calling another party, transmitting data, storing a file, storing data, enabling a speaker function, responding to a query, indicating a response to the data displayed, printing a file, playing a music file, deleting a file, retrieving a file, establishing a communications link, responding to vendors, typing an e-mail address, purchasing securities, and shopping.

309. The phone appliance according to claim 308, wherein the music file is an MP3 file.

310. The phone appliance according to claim 290, wherein the phone appliance defrays at least a part of the cost associated with making communications.

311. The phone appliance according to claim 290, wherein the phone appliance is configured to compress the VoIP communications and/or the data communications.

312. The phone appliance according to claim 290, further comprising a digital signal processing capability for processing the VoIP communications and/or the data communications.

313. The phone appliance according to claim 290, wherein the phone appliance performs at least one gateway function.

314. The phone appliance according to claim 290, wherein the phone appliance further comprises circuitry for communicating with a cellular network.

315. The phone appliance according to claim 314, wherein the cellular network is a GSM cellular network.

316. The phone appliance according to claim 290, wherein the phone appliance accesses the at least one data network via broadband.

317. The phone appliance according to claim 290, further comprising software for receiving and transmitting email.

318. The phone appliance according to claim 290, wherein the phone appliance includes at least one phone functionality, said at least one phone functionality includes enabling a user to use a keypad with a plurality of numeric digits for selecting a combination of said digits to make the at least one phone call via the VoIP communications.

319. The phone appliance according to claim 290, wherein said display screen is configured for the user interacting with said display screen to make the at least one phone call via VoIP.

320. A method for facilitating voice-over-data and/or data communications, including making at least one phone call to at least one party via voice-over-the-Internet protocol (VoIP) data communications via at least one data network, the method comprising:

providing a wireless connection between a computing device and at least one phone appliance, said wireless connection facilitating transmission of the VoIP data communications, and the data communications for display, by said at least one phone appliance;

receiving, via the wireless connection, the VoIP data communications, and the data communications for display, by said at least one phone appliance; and transmitting the VoIP communications, and the data communications for display, by the at least one phone appliance;

wherein the at least one phone appliance is configured for accessing the Internet for viewing and downloading Internet content, including video, and further configured for downloading software for adding at least one additional function to said at least one phone appliance;

wherein, when said at least one phone appliance is operable, a time when a user initiates downloading the data communications for display by said at least one phone appliance via the user accessing the Internet content is independent of a time when the user makes the at least one phone call;

wherein the at least one data network includes a data network, and wherein the VoIP communications, and the data communications for display, by said at least one phone appliance, are transmitted via the data network; and wherein said at least one phone appliance makes the at least one phone call to the at least one party via the VoIP data communications, said at least one phone call to the at least one party can be non pre-selected by the phone appliance and said at least one phone call to the at least one party can be pre-selected by the phone appliance.

321. The method according to claim 320, further comprising the step of displaying the data communications on a touch screen display of the at least one phone appliance.

322. The method according to claim 320, further comprising the step of recording audio data, including the VoIP communications, by the at least one phone appliance.

323. The method according to claim 320, further comprising the step of configuring the at least one phone appliance to compress the VoIP communications and/or the data communications.

324. The method according to claim 320, wherein the at least one phone appliance is a mobile phone device.

325. The method according to claim 320, wherein the data communications are selected from the group consisting of an advertisement, multimedia, a video clip, an electronic message, a query, an order form, and information from at least one vendor.

326. The method according to claim 320, further comprising the step of software receiving and transmitting email by the at least one phone appliance.

327. The method according to claim 320, further comprising the step of encrypting and/or decrypting data.

328. The method according to claim 320, further comprising the step of the at least one phone appliance communicating with the computing device.

329. The method according to claim 320, further comprising the step of the at least one phone appliance displaying and/or transmitting video.

330. The method according to claim 320, further comprising the steps of the at least one phone appliance mimicking a computing device and performing at least one function of the computing device.

331. The method according to claim 320, wherein the at least one phone appliance comprises a display screen, said display screen is a touch screen display selected from the group consisting of a liquid crystal display and a light emitting diode display.

332. The method according to claim 320, further comprising the step of the at least one phone appliance downloading data from the at least one data network, wherein the data downloaded includes software, and wherein the software is application software.

333. The method according to claim 320, wherein a communication in response to the received VoIP communications and/or the data communications includes identifying information for identifying the at least one phone appliance and a user.

334. The method according to claim 320, further comprising the step of defraying at least a part of the cost associated with making communications.

335. The method according to claim 320, further comprising the step of processing the VoIP communications and/or the data communications using a digital signal processor.

336. The method according to claim 320, further comprising the step of performing at least one gateway function.

337. The method according to claim 320, wherein the step of providing a wireless connection further comprises the step of communicating with a cellular network.

338. The method according to claim 320, further comprising the step of the at least one phone appliance accessing the at least one data network via broadband.

339. The method according to claim 320, wherein the at least one phone appliance includes at least one phone functionality, said at least one phone functionality includes enabling a user to use a keypad with a plurality of numeric digits for selecting a combination of said digits to make the at least one phone call via the VoIP communications.

340. The method according to claim 320, wherein said phone appliance includes a display screen configured for the user interacting with said display screen to make the at least one phone call via VoIP.

341. A phone appliance for facilitating sending voice-over-data and/or data communications, including making at least one phone call to at least one party via voice-over-the-Internet protocol (VoIP) data communications via at least one data network, said phone appliance comprising:
  a transceiver for transmitting and receiving the VoIP communications and the data communications via the at least one data network; and
  a display screen for displaying at least one data communication received via the at least one data network;
  said phone appliance configured for Internet access for viewing Internet content and for downloading software via the Internet for adding at least one additional function to said phone appliance, and said phone appliance further configured for generating a response to the received VoIP communications and/or the data communications and for transmitting the response;
  wherein, when said phone appliance is operable, a time when a user initiates downloading of the at least one data communication received for display by the display screen via the user accessing the Internet content is independent of a time when the user makes the at least one phone call;
  wherein the at least one data network includes a data network, and wherein the VoIP communications, and the data communications for display by said phone appliance, are transmitted via the data network; and
  wherein said phone appliance makes the at least one phone call to the at least one party via the VoIP data communications, said at least one phone call to the at least one party can be non pre-selected by the phone appliance and said at least one phone call to the at least one party can be pre-selected by the phone appliance.

342. The phone appliance according to claim 341, wherein the display screen is a touch screen display, and wherein a response is generated via user interaction with the touch screen display.

343. The phone appliance according to claim 341, further comprising software for recording the VoIP communications.

344. The phone appliance according to claim 341, wherein the phone appliance is configured to compress the VoIP communications and/or the data communications.

345. The phone appliance according to claim 341, wherein the phone appliance is a mobile phone device.

346. The phone appliance according to claim 341, wherein the data communications are selected from the group consisting of an advertisement, multimedia, a video clip, an electronic message, a query, an order form, and information from at least one vendor.

347. The phone appliance according to claim 341, further comprising software for receiving and transmitting email.

348. The phone appliance according to claim 341, further comprising software for encrypting and/or decrypting data.

349. The phone appliance according to claim 341, wherein the phone appliance includes at least one phone functionality, said at least one phone functionality includes enabling a user to use a keypad with a plurality of numeric digits for selecting a combination of said digits to make the at least one phone call via the VoIP communications.

350. The phone appliance according to claim 341, wherein the phone appliance communicates with a computing device.

351. The phone appliance according to claim 341, wherein the phone appliance further comprises software for sharing at least one resource of a computing device.

352. The phone appliance according to claim 341, further comprising software for providing a video function.

353. The phone appliance according to claim 341, further comprising software for displaying and/or transmitting a video image.

354. The phone appliance according to claim 341, further comprising software for processing the VoIP communications and/or the data communications for transmission to and/or receipt from a computing device and/or a network.

355. The phone appliance according to claim 341, wherein the phone appliance is configured to mimic a computing device and to perform at least one function of the computing device.

356. The phone appliance according to claim 341, wherein the display screen is a touch screen display, said touch screen display is selected from the group consisting of a liquid crystal display and a light emitting diode display.

357. The phone appliance according to claim 341, wherein the at least one data communication downloaded includes application software.

358. The phone appliance according to claim 341, wherein a communication in response to the received at least one data communication includes identifying information for identifying at least one of the phone appliance and a user.

359. The phone appliance according to claim 341, comprises at least one key for performing at least one task and/or function including transmitting and/or receiving the Internet content.

360. The phone appliance according to claim 341, wherein the phone appliance is configured for performing at least one function selected from the group consisting of redialing, completing a call, recording data, placing an order, accessing e-mail, accessing information, transmitting an e-mail, transmitting a facsimile, calling another party, transmitting data, storing a file, storing data, enabling a speaker function, responding to a query, indicating a response to the data displayed, printing a file, playing a music file, deleting a file, retrieving a file, establishing a communications link, responding to vendors, typing an e-mail address, purchasing securities, and shopping.

361. The phone appliance according to claim 360, wherein the music file is an MP3 file.

362. The phone appliance according to claim 341, wherein the phone appliance defrays at least a part of the cost associated with making communications.

363. The phone appliance according to claim 341, further comprising a digital signal processor for processing the VoIP communications and/or the data communications.

364. The phone appliance according to claim 341, wherein the phone appliance performs at least one gateway function.

365. The phone appliance according to claim 341, wherein the phone appliance further comprises circuitry for communicating with a cellular network.

366. The phone appliance according to claim 341, wherein the phone appliance accesses the at least one data network via broadband.

367. The phone appliance according to claim 341, wherein said display screen is configured for the user interacting with said display screen to make the at least one phone call via VoIP.

* * * * *